United States Patent [19]
Tink et al.
[11] 3,812,292
[45] May 21, 1974

[54] DIGITAL COMMUNICATION SYSTEM

[75] Inventors: Robert MacMillan Tink, San Diego, Calif.; Bob Jim Baker, Walton, W. Va.

[73] Assignee: The National Cash Register Company, Dayton, Ohio

[22] Filed: July 16, 1973

[21] Appl. No.: 379,275

Related U.S. Application Data

[63] Continuation of Ser. No. 225,793, Feb. 14, 1972.

[52] U.S. Cl. .............................. 179/2 DP, 178/68
[51] Int. Cl. .............................. H04b 3/50
[58] Field of Search ........... 178/64, 66, 68; 336/55; 330/195, 196; 179/15 AL; 307/88 MP

[56] References Cited

UNITED STATES PATENTS

| | | | |
|---|---|---|---|
| 2,983,905 | 5/1961 | Buser | 307/88 MP |
| 3,680,056 | 7/1972 | Kropfl | 179/15 AL |
| 2,803,759 | 8/1957 | Kreuder | 307/88 MP |
| 2,708,219 | 5/1955 | Carver | 336/155 |
| 3,576,879 | 11/1969 | Zenner | 178/68 |

OTHER PUBLICATIONS

RCA Technical Note No. 800, "Data Transfer Circuit," Helbig et al., Oct. 25, 1968.

*Primary Examiner*—Kathleen H. Claffy
*Assistant Examiner*—David L. Stewart
*Attorney, Agent, or Firm*—J. T. Cavender; Laurence P. Benjamin

[57] ABSTRACT

A short distance binary telephone communications system employing a transformer having a square hysteresis loop core as a transmitter. The binary signal is differentiated by the transformer and applied to a short conventional telephone line. The receiver employs an impedance matching transformer to drive a flip-flop to reproduce the input binary signal.

4 Claims, 3 Drawing Figures

PATENTED MAY 21 1974 3,812,292

DIGITAL COMMUNICATION SYSTEM

This is a continuation of application Ser. No. 225,793, filed Feb. 14, 1972.

SUMMARY OF THE INVENTION

The present invention relates to digital data transmission systems and more particularly to a short-distance transmitter and receiver for transmitting and receiving digital data over a telephone transmission line, connected between a central computer and an on-line terminal. The present invention is directed toward a transmitter-receiver, or modem, of extremely low cost suitable for use over transmission distances less than 2 miles. Presently known data sets being used for such purposes are normally intended for transmission of data over much longer distances and, accordingly, such data sets are too complex and expensive for such short distance use.

A computer and associated peripheral devices, such as on-line terminals, are connected into the ordinary voice telephone communication system by a device for conditioning the digital signals for transmission over the telephone facilities and further conditioning the incoming signals for acceptance by the receiving equipment. Normally, devices of this type employ frequency shift keying. The frequency of a voltage controlled oscillator is set at 1,200 hertz to represent a "mark", a binary one, and at 2,200 hertz to represent a "space", or binary zero. The mark and space frequencies fall within the normal voice telephone range and may readily be transmitted for long distances over normal telephone circuits. At the receiver, the mark and space frequencies demodulated and translated back into normal binary digital pulse data form. In the present invention, however, the transmitter consists of a transformer having a core of magnetic material with a square hysteresis loop characteristic. The digital pulses from the transmitting unit are shaped by the square hysteresis characteristic of the transformer core and are fed directly to the phone line from the secondary of the transformer. At the receiver, an impedance matching transformer applies the pulses voltages to a pair of clamped diodes which control the operation of a lightly loaded flip-flop to restore the binary signal. As a result, a simple, low-cost digital data communication system adequate for use over short distances is disclosed hereinbelow.

DESCRIPTION OF THE INVENTION

A large amount of the data sent from on-line terminals to a central computer comes from units clustered in locations such as banks and department stores. An inexpensive method of utilizing the telephone lines to carry this data is highly desirable. A device enabling transmission over a two mile length of telephone line enables interconnection of large department store complexes, or large bank installations.

In the present invention, a core transformer is coupled to the standard computer communications interface normally employed for controlling a modem. A core transformer is employed as a transmitter since it is inherently balanced, enabling common mode noise rejection. It can be inexpensively designed for protection against accidental high voltage surges on the communication line, and it enables simple, convenient impedance matching to the line. Normal mark and space signals from the interface cannot be applied directly to the telephone line, since they act as a substantially direct current, when, as in asynchronous systems, the steady mark condition is transmitted between messages. Telephone equipment which may be on the line will block D.C. To avoid this problem, mark and space signals from the interface are differentiated by the square hysteresis loop characteristic of the transformer core. Such a transformer operates in a manner similar to a magnetic core memory element. To avoid a short duration pulse with its high frequency spectrum, the core transformer is employed with a second transformer having good low frequency response at the input to the receiver. The signal output from the core transformer is bipolar, having no D.C. component. The shape of the core transformer output signal has the typical, rounded shape of a current switched core, thereby keeping the output impedance low and avoiding the necessity of filtering out spikes in the differentiated signal.

Figure 1:
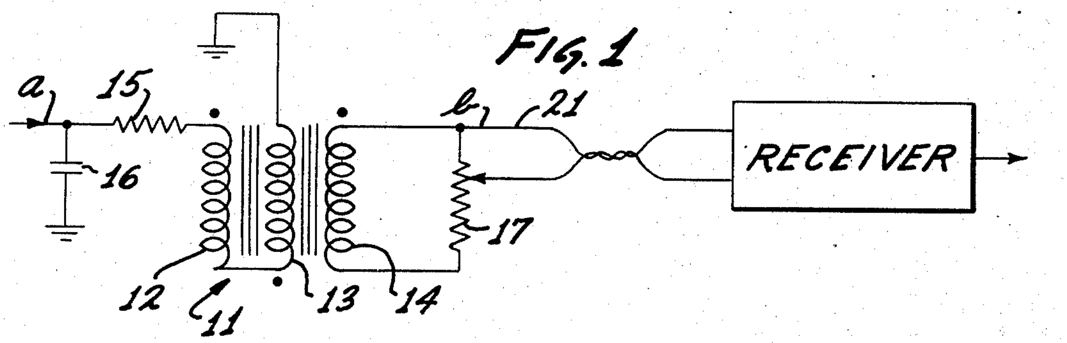
FIG. 1 illustrates the transmitter of the present invention connected to a telephone line.
Figures 2, 3:
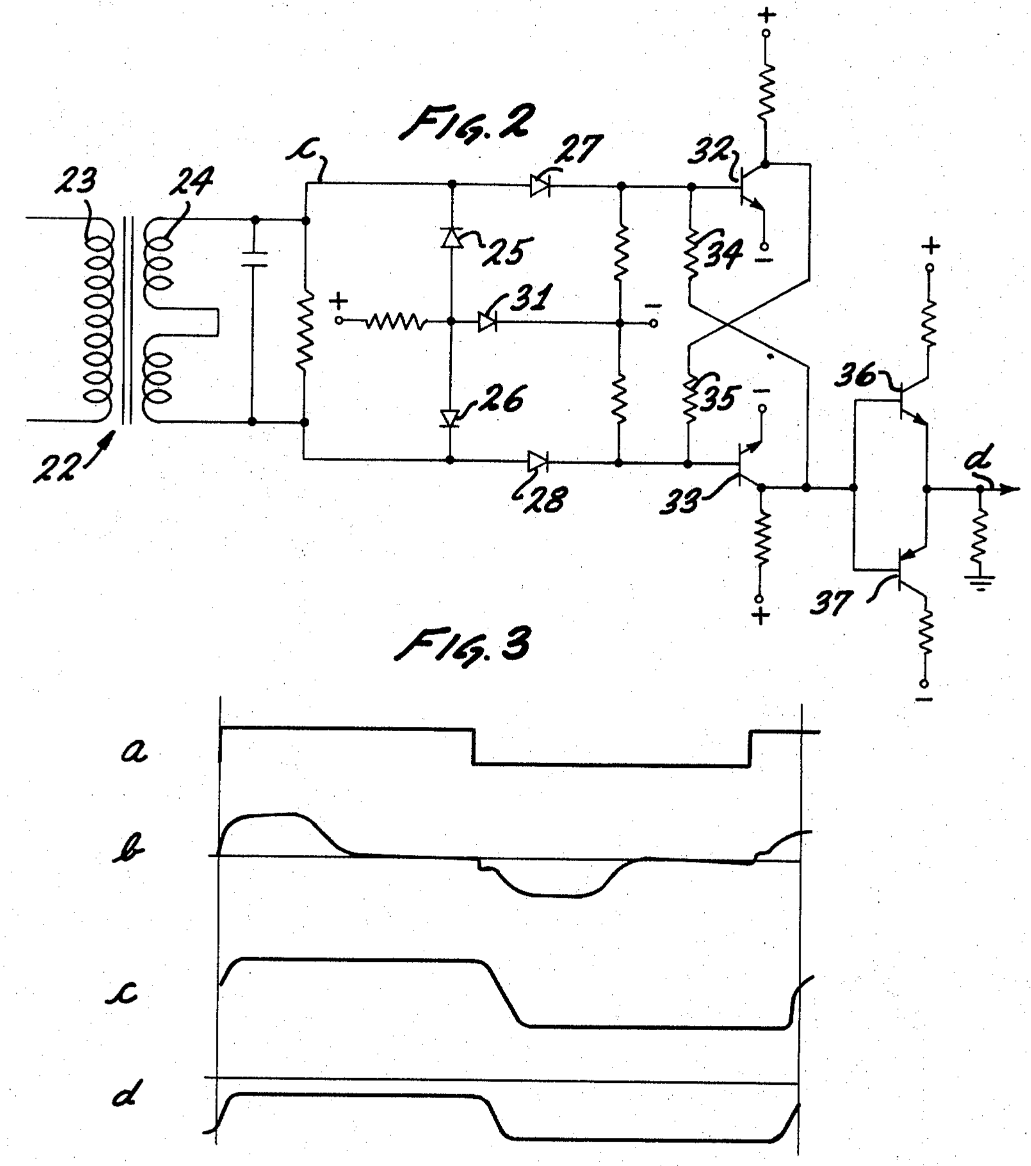
FIG. 2 illustrates the receiver employed in the present invention.
FIG. 3 represents wave forms illustrating the operation of the present invention.

Referring now to FIG. 1, the transmitter comprises a tape wound core transformer 11 having primary winding in two sections 12 and 13, and a secondary winding 14. A resistor 15 is inserted in series between the data driver, or interface, and the primary winding 12 of core transformer 11 to match the output impedance of the interface. A capacitor 16 prevents the sharp leading edges of the pulses from the interface, illustrated by FIG. 3*a*, from appearing at the core transformer output. The output signal from the secondary winding 14, illustrated by FIG. 3*b*, is applied to a level setting potentiometer 17, and to telephone line 21. As will be apparent, the output signals, FIG. 3*b*, are somewhat rounded square waves. The output impedance of winding 14 is designed to equal the standard 600 ohm impedance of a telephone line.

Such a data transmitter does not require any power supply. Energy is supplied by the plus or minus 5 volt signal from the interface drive unit.

The receiver employed in the present invention includes a line transformer 22 having a primary winding 23 connected to the telephone line and presenting the required 600 ohm impedance thereto. The secondary winding 24 of the transformer 22 is connected to a diode clamp circuit. Diodes 25 and 26 clamp the secondary winding 24 of transformer 22 to the bias voltage at the anode of diode 31, whereby the output of the transformer, illustrated by FIG. 5*c*, appears at diode 28 for one polarity of received signal and at diode 27 for the other polarity of the received signal.

Transistors 32 and 33, together with resistors 34 and 35 interconnected between the base of one transistor and the collector of the other, form a flip-flop of a type well-known to those skilled in the art.

Diode 31 creates a bias voltage also applied to diodes 25 and 26. Diodes 25 and 26 alternately clamp either side of secondary winding 24 of transformer 22 to the bias level when the other side of winding 24 is triggering the flip-flop. In this manner, the bipolar signal on the transmitter interface is reproduced at the receiver end, at a level sufficiently high to drive the standard receiving interface. Transistors 26 and 27, having bases connected to the collector of flip-flop transistor 33, serve to balance the load on the power supply voltages for either state of the flip-flop. The power required for the receiver of the present invention is so small that it may be drawn from the interface control circuits, making it possible to produce telephone line transmission and reception without the additional expense of an external power supply. These standard control circuits, such as the Data Terminal Ready line, may supply the positive 5 volts power required, while the negative 5 volts may be supplied by the line. The output, illustrated by FIG. 5*d*, is a reproduction of the signal of FIG. 5*a* originally applied to the primary winding 12 of core transformer 11.

What is claimed is:

1. A digital communication system for coupling a communications interface to a central computer comprising:

A. a data transmission line;

B. a transmitter coupling the communications interface to a first end of said data transmission line, said transmitter including a first transformer, said first transformer including:

1. a primary winding coupled to the communications interface,
2. a secondary winding coupled to said first end of said data transmission line,
3. a core imparting magnetic characteristics to said transformer such that application of a square wave to said primary winding results in a bipolar, altered shape signal appearing across said secondary winding;

C. a receiver coupling the second end of said data transmission line to the central computer, said receiver including:

1. a second transformer having:
   a. a primary winding connected to said second end of said data transmission line, and
   b. a secondary winding having first and second output terminals,
2. a diode clamp circuit electrically disposed between said first and second output terminals of said secondary winding of said second transformer, said diode clamp circuit including:
   a. first and second diodes serially connected across said secondary winding, each of said first and second diodes having first and second electrodes of first and second polarities, first electrodes of said first and second diodes being connected together at a junction,
   b. a bias voltage source of said second polarity,
   c. a third diode having first and second electrodes of first and second polarities, said first electrode thereof being connected to said junction and said second electrode thereof being connected to said bias voltage source, whereby the signal from said second transformer appears at said first output terminal for one polarity of signal received from said data transmission line and at said second output terminal for the second polarity of signal received;
3. a flip-flop having first and second input terminals and configured such that a signal applied to said first input terminal triggers said flip-flop to its first stable state and a signal applied to said second input terminal triggers said flip-flop to its second stable state; and
4. fourth and fifth diodes coupled, respectively, between said first output terminal of said second transformer and said first input terminal to said flip-flop and between said second output terminal of said second transformer and said second input terminal to said flip-flop, each of said fourth and fifth diodes having first and second electrodes having first and second polarities, said first electrodes thereof being connected, respectively, to said first and second output terminals of said second transformer.

2. The digital communication system of claim 1 which further includes:

A. impedance matching means disposed in circuit between the communications interface and said primary winding of said first transformer; and B. signal level adjusting means in circuit between said secondary winding of said first transformer and said first end of said data transmission line.

3. The digital communication system of claim 2 which further includes a capacitor connected between a reference potential and a common terminal electrically disposed between the communications interface and said impedance matching means.

4. The digital communication system of claim 3 in which said core of said first transformer is fabricated from a material exhibiting square hystersis loop magnetic characteristics.

* * * * *